US 6,598,135 B1

(12) United States Patent
MacLeod

(10) Patent No.: US 6,598,135 B1
(45) Date of Patent: Jul. 22, 2003

(54) SYSTEM AND METHOD FOR DEFINING REWRITEABLE DATA STORAGE MEDIA AS WRITE ONCE DATA STORAGE MEDIA

(75) Inventor: Robert Kent MacLeod, Hopkins, MN (US)

(73) Assignee: Plasmon IDE, Eden Prairie, MN (US)

( * ) Notice: Subject to any disclaimer, the term of this patent is extended or adjusted under 35 U.S.C. 154(b) by 0 days.

(21) Appl. No.: 09/564,138

(22) Filed: May 3, 2000

(51) Int. Cl.⁷ .............................. G06F 12/00; G11B 7/24
(52) U.S. Cl. .................... 711/163; 711/154; 369/275.2; 369/275.5
(58) Field of Search ................................. 711/163, 154, 711/100, 104, 170; 369/275.5, 275.2; 714/6; 360/60

(56) References Cited

U.S. PATENT DOCUMENTS

| 4,691,299 A | 9/1987 | Rivest et al. |
| 4,710,797 A | 12/1987 | Tanaka |
| 4,852,075 A | 7/1989 | Feyrer et al. |
| 4,939,713 A | 7/1990 | Satoh et al. |
| 4,947,367 A | 8/1990 | Chang et al. |
| 4,953,122 A | 8/1990 | Williams |
| 5,029,125 A | 7/1991 | Sciupac |
| 5,040,110 A | 8/1991 | Miki et al. |
| 5,107,481 A | 4/1992 | Miki et al. |
| 5,120,136 A | 6/1992 | Oakley |
| 5,233,576 A | 8/1993 | Curtis et al. |
| 5,360,651 A | 11/1994 | Baxter et al. |
| 5,446,857 A | 8/1995 | Russ |
| 5,475,820 A | 12/1995 | Natrasevschi et al. |
| 5,802,028 A | 9/1998 | Igarashi |
| 6,104,561 A * | 8/2000 | Braithwaite ............... 360/60 |
| 6,229,784 B1 * | 5/2001 | Yoshimoto ............ 369/275.2 |
| 6,289,423 B1 * | 9/2001 | Ozaki ...................... 711/163 |
| 6,317,281 B1 * | 11/2001 | Ogawa ........................ 360/60 |

FOREIGN PATENT DOCUMENTS

| EP | 0452884 A3 * | 10/1991 | ........... G11B/7/007 |
| EP | 0452884 | 9/1992 | |
| EP | 0652561 | 5/1995 | |
| JP | 60003029 A * | 1/1985 | ........... G06F/11/00 |

OTHER PUBLICATIONS

IBM Technical Disclosure Bulletin, Dual Media Optical Disk, vol. 37, No. 11, Nov., 1994.

* cited by examiner

Primary Examiner—Kimberly McLean-Mayo
(74) Attorney, Agent, or Firm—Gerald E. Helget; Nelson R. Capes; Briggs and Morgan

(57) ABSTRACT

A system and method for defining rewriteable data storage media defined by ECMA Standard ECMA-272 $2^{nd}$ edition (1999) for 120 mm DVD rewriteable disk (DVD-RAM) as a write once data storage media and for storing data thereon. The apparatus consists of a data storage device for reading and writing data on the media, the media, a media type indicator in the media, two write protect flags in the user data area of the media, and programming to examine the two write protect flags prior to a write, erase, or format operation. If both flags match and the media type indicator is write once, the drive is prevented from writing to the user data area if both flags are in the data written state. If both flags do not match after two re-reads, an error message is generated. If both flags are in the data unwritten state, data is written to the user data area and both flags are set to the data written state.

13 Claims, 5 Drawing Sheets

FIGURE 1 - (PRIOR ART) LAYOUT OF SECTOR IN REWRITABLE AREA OF 120mm
DVD-RAM
PER ECMA STANDARD 272.
Note that the number in each field represents the number of bytes in that field.

|        |        |           |         | Recording Field |    |      |     |         |            |
|--------|--------|-----------|---------|-------|----|------|-----|---------|------------|
| Header | Mirror | Gap       | Guard1  | VFO 3 | PS | Data | PA3 | Guard 2 | Buffer     |
| 128    | 2      | 10+(J/16) | 20+K    | 35    | 3  | 2418 | 1   | 55-K    | 25-(J/16)  |

FIGURE 2 – PROPOSED LAYOUT OF SECTOR IN USER AREA OF 120mm DVD-WORM.
Note that the number in each field represents the number of bytes in that field.

|        |        |           |        |     | Recording Field |    |      |     |         |     |           |
|--------|--------|-----------|--------|-----|-------|----|------|-----|---------|-----|-----------|
| Header | Mirror | Gap       | Guard1 | WPF | VFO 3 | PS | Data | PA3 | Guard 2 | SWF | Buffer    |
| 128    | 2      | 10+(J/16) | 22     | 5   | 35    | 3  | 2418 | 1   | 43      | 5   | 25-(J/16) |

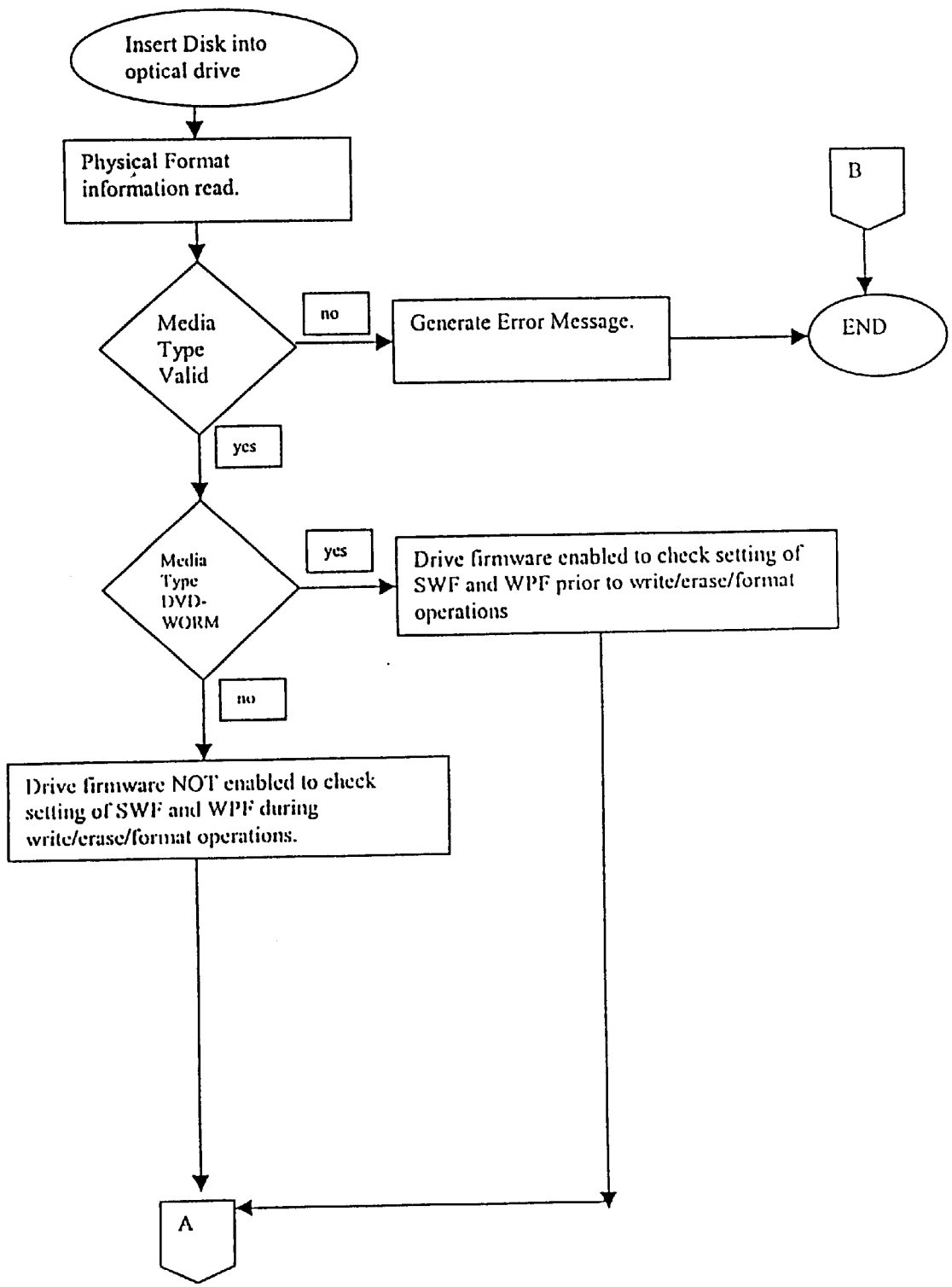
FIGURE 3a – FLOWCHART OF WRITE PROTECT PROCESS

Figure 4 – Physical format information

| Byte position | Contents | Number of bytes |
|---|---|---|
| 0 | Disk Category and Version Number | 1 |
| 1 | Disk Size and maximum transfer rate | 1 |
| 2 | Disk structure | 1 |
| 3 | Recording density | 1 |
| 4 to 15 | Data Zone Allocation | 12 |
| 16 to 31 | Reserved | 16 |
| 32 | Disk Type Identification | 1 |
| 33 to 47 | Reserved | 15 |
| 48 | Velocity 1 | 1 |
| 49 | Read Power at Velocity 1 | 1 |
| 50 | Peak Power on the land track at Velocity 1 | 1 |
| 51 | Bias Power on the land track at Velocity 1 | 1 |
| 52 | First pulse starting time on the land track at Velocity 1 | 1 |
| 53 | First pulse ending time on the land track at Velocity 1 | 1 |
| 54 | Multiple-pulse duration on the land track at Velocity 1 | 1 |
| 55 | Last pulse starting time on the land track at Velocity 1 | 1 |
| 56 | Last pulse ending time on the land track at Velocity 1 | 1 |
| 57 | Bias Power 2 duration on the land track at Velocity 1 | 1 |
| 58 | Peak power on the groove track at Velocity 1 | 1 |
| 59 | Bias Power 1 on the groove track at Velocity 1 | 1 |
| 60 | First pulse starting time on the groove track at Velocity 1 | 1 |
| 61 | First pulse ending time on the groove track at Velocity 1 | 1 |
| 62 | Multiple-pulse duration on the groove track at Velocity 1 | 1 |
| 63 | Last pulse starting time on the groove track at Velocity 1 | 1 |
| 64 | Last pulse ending time on the groove track at Velocity 1 | 1 |
| 65 | Bias Power 2 duration on the groove track at Velocity 1 | 1 |
| 66 to 479 | Reserved for write conditions at Velocity 2 to Velocity 24 | 414 |
| 480 to 2047 | Reserved | 1568 |

FIGURE 5 – SYSTEM DIAGRAM
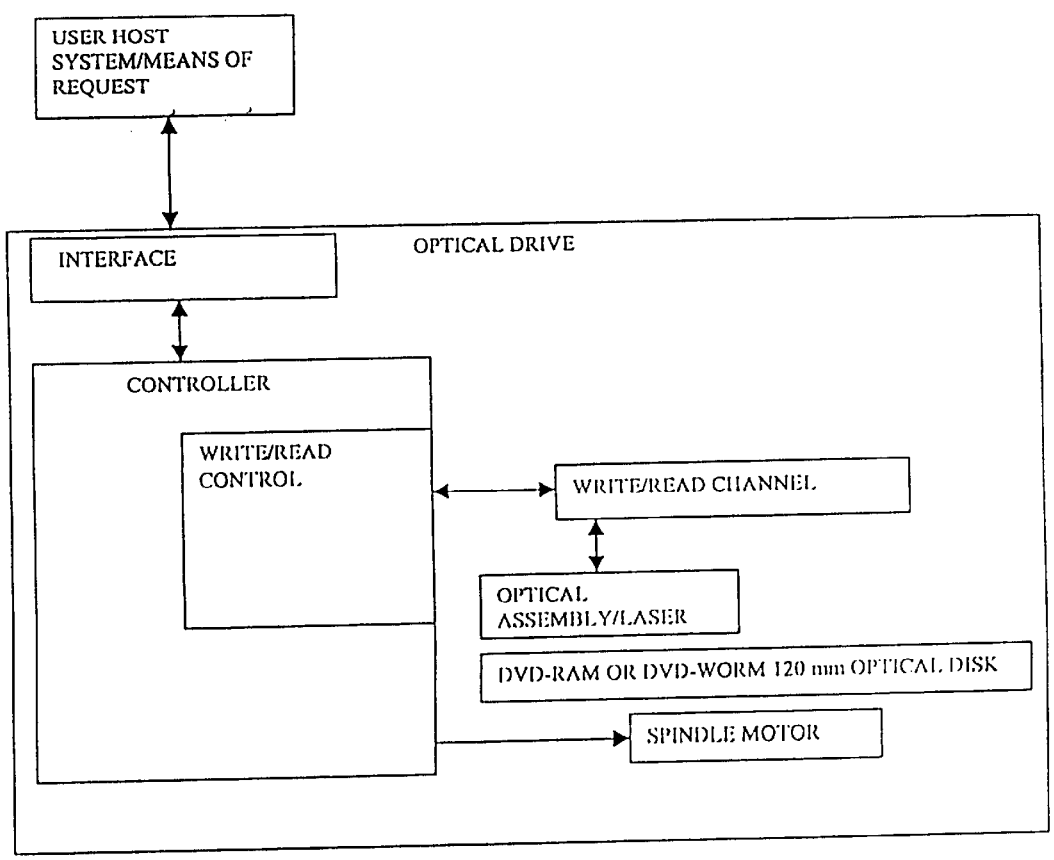

SYSTEM AND METHOD FOR DEFINING REWRITEABLE DATA STORAGE MEDIA AS WRITE ONCE DATA STORAGE MEDIA

BACKGROUND OF THE INVENTION

The present invention relates to a new category of DVD-RAM optical disk media (herein called "DVD-WORM" (Write Once, Read Many), and particularly to one that enables the user to have the capability of allowing data to be written to a sector only once and read many times.

The 120 mm DVD optical disk products available in the market fit into three categories: DVD-RAM, which are writeable, erasable and re-writeable; DVD-R, which is a recordable write-once version; and DVD-ROM, which is a read only version.

DVD-RAM media is composed of a phase change material. The material is constructed such that the recording medium can take on one of two distinct states. One of the states is amorphous and the other state is crystalline. Each of these two states has reflectivity levels that are different. That is, the crystalline state has a high degree of reflectivity while the amorphous state has a lower degree of reflectivity. The difference in reflectivity is detected by the optics and associated circuitry within a DVD-RAM drive. It is this difference in reflectivity that enables data to be recorded and read back.

The process of writing data onto DVD-RAM discs is achieved by a phase change effect typically created in the following manner; the disk is rotated upon a spindle motor contained within the drive. As the disk rotates at a given speed, a laser assembly within the drive heats a minute region [spot] of the disc recording layer. Typically the surface area of the region of the media being heated by the laser is brought to a temperature above its melting point. As the material cools, the area of the media that was effected by the laser beam cools into an amorphous state. This minute region or spot, which is now in an amorphous state, now reflects light at a lower reflectivity level. This minute region of the media will stay in this state until a laser beam that contains sufficient energy returns the molecules to a crystalline state which in effect erases the data as was represented by the amorphous state.

As the laser beam intensity can be modulated at a very high frequency, the area of the disc that is heated is correspondingly very small and can be thought of as a mark or bit. The length of the mark, or the time the laser is turned on, can also be varied so that marks of different duration can be written.

DVD-R discs are considered 'write-once' in that once the disc is written there is no concern that the data may be erased, overwritten, or altered. For a user to record information on DVD-R discs a unique drive which can write DVD-R media is required. Currently, DVD-RAM drives are unable to write to DVD-R discs. User data which is recorded on DVD-RAM media can be write protected, however, the method of write protection involves the setting (manually done by the user) of a mechanical tab on the cartridge case. When the cartridge is inserted into a DVD-RAM drive, the position of the write protect tab is typically sensed by a mechanical switch within the drive itself. This method of write protection creates areas of concern to the user who wishes to protect data.

The first area of concern is that a user may unintentionally forget to set the write protect tab to the write protect position and thereby allow overwrites of previously recorded data to occur.

The second area of concern is that user data may be intentionally overwritten or altered simply by changing the position of the write protect tab from 'read only' to 'write', overwriting or altering the data, and then resetting the position of the write protect tab from 'write' to 'read only'.

The third area of concern is that the mechanical switch within the drive itself may fail or become intermittent and thereby not provide a reliable method of protecting data.

A fourth area of concern is the storage and use of DVD-RAM media within automated storage libraries. Depending on the design methodology utilized by the manufacturer of the automated storage library, the DVD-RAM media may or may not be stored in cartridges when resident in the library. For example, media may be removed from the cartridge and placed on a tray that is then stored within the library. One of the issues with removing the media from the cartridge is that once the media is removed from the cartridge the write protect capability of the write protect tab is lost. Therefore the user does not have the capability of protecting data when media is stored in this fashion.

Currently the need for a new category of DVD-RAM media is beginning to take shape in the marketplace. This category of media is one that enables the user to have the capability of allowing data to be written to a sector only once and read many times. For the purposes of this document this media shall be termed DVD-WORM (Write Once Read Many). The primary application for this new product type would be any application where data must be stored and protected in it's original form without the possibility of intentional or unintentional altering or overwriting.

U.S. Pat. No. 5,233,576, issued to Curtis et. al., discloses an apparatus and method for defining magneto-optical disk media and an optical storage device that allows the media to be convertible from writeable to read-only.

The present invention differs significantly from Curtis in a number of ways.

First, there are differences in the underlying media technology. The present invention is to be used with DVD rewriteable media that is of the type known in the industry as "phase change media." Phase change media uses a different write/read methodology than that of magneto-optical. Phase change media is originally in a crystalline state. Phase change data is written by heating a minute region of the media above its melting point. As it cools it takes on an amorphous state. The amount of light read back or returned to the optic assembly in the drive is based upon the degree of reflectivity of the media. Crystalline media will return more light than an amorphous bit. In contrast, magneto-optical drives write data by heating a minute region of the media to its Curie Temperature in the presence of a magnetic field. This sets the magnetic polarity to that of the applied external magnetic field. Magneto-optical drives read data based upon the angle of rotation of the light returned to the optic assembly in the drive.

Second, the international standards used are considerably different. Curtis is based on media structure defined by the ISO Standard 10089 for 130 mm magneto-optical media. In contrast, the present invention is based upon the logical structure as defined by the ECMA standard ECMA-272 $2^{nd}$ edition (1999) for 120 mm DVD Rewriteable Disk (DVD-RAM).

Third, Curtis allows, in the first embodiment, a sector to be written to as many times as desired until the 'storage state bit' has been changed to read-only state. In contrast, the present invention does not allow any rewriting of sectors under any condition. That is, any sector can be written only once. Once the sector is written, write protect flags are set that protect the data in the written sector.

Fourth, the present invention utilizes two write protect flags to provide an added security level of write protection. In addition, the two write protect flags consist of multiple bytes in each flag. This is a more robust method than Curtis, which uses a single bit for data protection, as the probability of a single bit being misread is much greater than that of a multiple-byte repeating sequence being misread.

Fifth, the present invention is usable whether or not the media is mounted within a cartridge. Magneto-optical media, such as disclosed in Curtis, is typically mounted within a cartridge and is typically not removed from the cartridge. The magneto-optical cartridge can itself provide a write protect capability by the use of a slide switch. Unlike magneto-optical media, DVD-RAM media can be removed from Type II DVD-RAM cartridges or the DVD-RAM media can be purchased not in a cartridge. Once the media is removed from the cartridge, all write protect capabilities are lost. Use of DVD-RAM media not in a cartridge can be found in the industry in autochanger applications. Typically users of DVD-RAM media in this manner do not have write protect functionality available within the drive.

SUMMARY OF THE INVENTION

It is proposed that the 120 mm DVD-WORM 2.6 GB disc and the 120 mm DVD-WORM 5.2 GB disc would be identical, note the exceptions defined in this document, to the 2.6 GB and 5.2 GB capacity 120 mm DVD-RAM disc as defined by the following ECMA (European Computer Manufacturers' Association) standards:

ECMA-273 (1998) Case for 120 mm DVD Rewriteable Disk (DVD-RAM)

ECMA-272 $2^{nd}$ edition (1999) 120 mm DVD Rewriteable Disk (DVD-RAM)

It is proposed that data should be written to and stored on 120 mm DVD-WORM optical disks in a manner consistent with the ECMA-272 standard for DVD-RAM with the following exceptions:

The DVD-WORM media itself would contain identification data that indicates that the media is of the type WRITE ONCE READ MANY (WORM) and is not of the type DVD-RAM.

The user data sectors themselves will contain sector write control information, flags, that will indicate if the user sector is blank (i.e. contains no user data) or if the user sector contains user data.

This identification data and specific sector write control information would differentiate this media type from the current DVD-RAM media types.

Using standard commands delivered to the drive via the standard interface, user data may be written to and read from the DVD-RAM drive that contains DVD-WORM media. The DVD-RAM drive firmware itself would require modification, by the drive manufacturer, to recognize the new DVD-WORM media type and also to perform the write once, read many, function.

BRIEF DESCRIPTION OF THE DRAWINGS

FIG. 1 shows the layout of a sector in the rewriteable area of 120 mm DVD-RAM per ECMA Standard 272, $2^{nd}$ edition (1999);

FIG. 2 shows the layout of a sector as in FIG. 1 under the present invention;

FIGS. 3a and 3b show a flowchart of the write protect process of the present invention;

FIG. 4 shows the layout of physical format information on data storage media of 120 mm DVD-RAM per ECMA Standard 272, $2^{nd}$ edition (1999); and FIG. 5 is a system block diagram of the present invention.

DETAILED DESCRIPTION OF THE PREFERRED EMBODIMENT

Figure 3B:
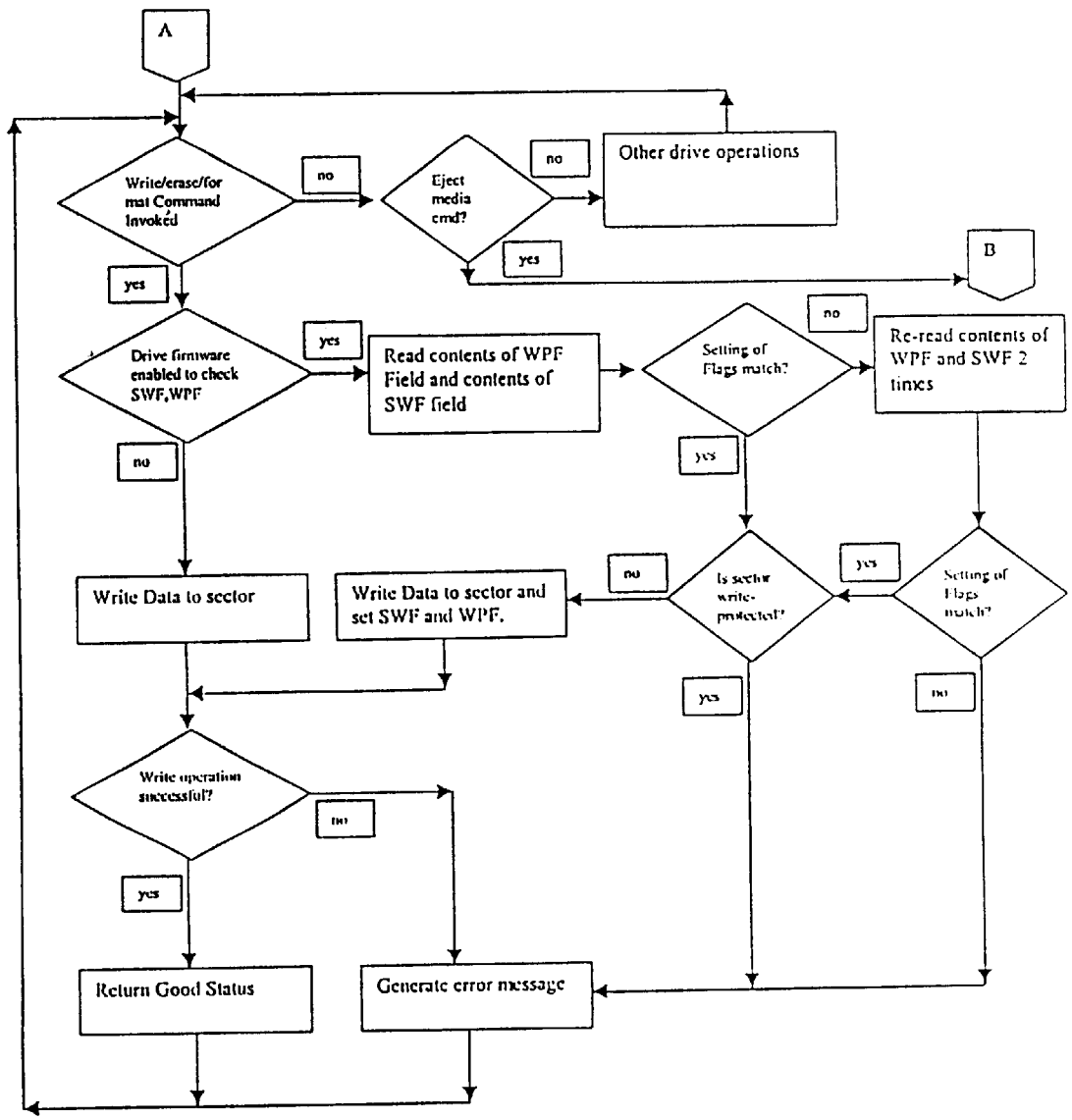

The DVD-WORM media are constructed, manufactured, and function in the identical fashion as DVD-RAM media. That is, DVD-WORM media are composed of a phase change material that is capable of taking on an amorphous state or a crystalline state. Each of the two states has reflectivity levels that are different. That is, the crystalline state has a high degree of reflectivity while the amorphous state has a lower degree of reflectivity. This difference in reflectivity enables data to be recorded and read back.

The process of writing data onto DVD-WORM discs is achieved in a manner identical to DVD-RAM discs, that is using a phase change effect typically created in the following manner; the disk will rotate upon a spindle motor contained within the drive. As the disk rotates at a given speed, a laser assembly within the drive will heat a minute region [spot] of the disc recording layer. The surface area of the region of the media being heated by the laser will be brought to a temperature above its melting point. As the material cools, the area of the media that was effected by the laser beam will cool into an amorphous state. This minute region or spot, now in an amorphous state, would reflect light at a lower reflectivity level.

As the laser beam intensity can be modulated at a very high frequency, the area of the disc that is heated is correspondingly very small and can be thought of as a mark or bit. The length of the mark, or the time the laser is turned on, can also be varied so that marks of different duration can be written. Typically, areas of low reflectivity (amorphous state) represent data marks.

To write meaningful data to the media, the laser is pulsed by the drive electronics and marks are written to the recording medium. Using this above method it is possible to store data in various sequences of ones and zeroes on the recording medium.

To read the data written to the disk, the same laser, now at a reduced power level, is used. The reflected light from the medium is fed to the read optics contained in the drive. The light reflected will either be of a high intensity or of a low intensity dependent upon the reflectivity level of the area of the media currently being scanned by the laser beam. The optics and circuitry within the drive are able to detect the difference in reflectivity and can translate this difference into 'zeroes' and 'ones'. Using this method the 'ones' and 'zeroes' encoded on an optical disk can be read back and translated by the drive into electronic 'ones' and 'zeroes' that then may be transmitted to a host computer. FIG. 5 illustrates a system block diagram.

With DVD-RAM media, data written to the disk, is typically directed to an unwritten sector(s) until all user sectors on the disk are written. However, the rewriting of a previously written sector is allowed. This may be accomplished at a system level by the deleting and rewriting of a user file or may be accomplished by low level commands where the user is directing the data to specific sector addresses on the media.

The proposed difference between DVD-RAM technology and DVD-WORM technology is the following: on the DVD-WORM disk there is a special code which will be pre-written on the disk which will indicate to the firmware in the drive that this disk is designated "write-once". This code will be contained in Byte 0 (Disk Category identifier, bits b7 through b4) of the Physical format information. Also, each user accessible sector FIG. 2 on the DVD-WORM media will contain codes which indicates if the sector contains user data (i.e. has been written) or does not contain user data (i.e. has not been written). In effect, each user data sector will contain a coded write-protect switch. For the purposes of this document the codes contained within each sector shall be termed a WRITE-PROTECT FLAG (WPF) and a SECTOR WRITTEN FLAG (SWF). The encoded information (WPF and SWF) in the user data sector are first read prior to any write attempts to the sector. If the flags have been 'set' then this indicates to the drive firmware that the data sector contains user data and that no write operation is to be allowed to that sector. If the flags have not been 'set' then this indicates to the drive firmware that the data sector does not contain user data and that write operations are allowed to that sector. The SECTOR WRITEN FLAG provides a redundant operation to the WRITE-PROTECT FLAG. Both are checked prior to allowing a write operation to the sector. If both flags are 'set' then no write operation is allowed, if both are 'not set' then a write operation is allowed, if one flag is 'set' and the other is 'not set', then the flags are to be re-read 2 times. If both flags are 'set' the sector will not be written. If both flags are 'not set' this indicates that the sector does not contain user data and a write operation will be allowed. If one flag still indicates the sector is empty while the other flag indicates the sector contains user data then a error message will be returned to the host and no write operation will be allowed to that sector.

The DVD-WORM logical disc structure and physical disc structure will be identical to that of the structure of DVD-RAM as defined by the ECMA standard 272 with the following exceptions:

The control data zone contains embossed control data for the drive. Sections of the control data zone include the physical format information and the disk manufacturing information. In the control data zone, Byte 0 (bits b3 through b0) of the Physical format information (FIG. 4) contains 0001 indicating compliance with the ECMA standard. As the new media type of DVD-WORM is not included in the ECMA standard, the information contained here shall be changed from 0001 to 1001.

For DVD-WORM media, Byte 0 (bits b7 through b4) of the Physical format information (FIG. 4) shall contain the data 0101 indicating that the disc category is DVD-WORM.

Byte 2 (bits b3 through b0) of the Physical format information (FIG. 4) shall contain the data 0101 indicating that the recording layer is a write-once layer. It must be noted that the technology utilized on the proposed DVD-WORM media for writing sectors cannot be considered to be of the irreversible type. The physical composition of DVD-WORM media is identical to that of DVD-RAM, which is a re-writeable media. The protection of data is accomplished through the use of encoded FLAGS in the user data sector.

With DVD-RAM media the Guard 1 field, which is located in the recording field of each sector, has a length of (20+K) bytes, where K is varied randomly from 0 to 7 bytes (FIG. 1 shows the Sector Layout of a sector in the Rewriteable Area per the ECMA 272 standard for 120 mm DVD Rewriteable Disk). The purpose of this is to protect the beginning of the VFO 3 field (the VFO 3 field immediately follows the Guard 1 field in the sector layout) from signal degradation after the media has been written to many times. With the DVD-WORM media the protection of the VFO 3 field from signal degradation is not required as it is intended that the media will be written to only once by the user. Therefore, with DVD-WORM media, the function of the Guard 1 field is changed as follows; The Guard 1 field will become a fixed length of 22 bytes. Immediately following the Guard 1 field shall be a 5 Byte field know as the WRITE PROTECT FLAG and will be used to indicate if the sector contains user data or is blank (i.e. does not contain user data).

To prevent overwrite of a previously written sector, the drive firmware will read this area that shall be known as the WRITE PROTECT FLAG (WPF) and which precedes the user data area of a sector. For user sectors the WRITE PROTECT FLAG field will be unrecorded if the data field of the sector is unrecorded. If the data field of the sector is recorded, then information will be written to the flag field indicating that the data field is recorded. The 5 bytes shall contain the pattern 1010 repeating to indicate that the sector is written and contains user data.

There is a second Guard field in the user sector that follows the user data area of the sector. In the DVD-RAM media specification this field is known as the Guard 2 field. The purpose of the Guard 2 field is to protect the end of the Data field from degradation after being written to many times. It is the last 20 bytes of the Guard 2 field that perform this function, the rest of the Guard 2 field compensates for the variation of actual length of the data written. With the DVD-WORM media the protection of the end of the Data field from signal degradation is not required as it is intended that the media will be written to only once by the user. The Guard 2 field is reduced to 43 bytes in length. Immediately following the Guard 2 field shall be a 5 byte area which shall be known as the SECTOR WRITTEN FLAG (SWF). When the sector does not contain user data, this field shall be unrecorded. If the data field of the sector is recorded, then information will be written to the flag field indicating that the data field is recorded. The 5 bytes shall contain the pattern 1010 repeating to indicate that the sector is written and contains user data.

The method of write-protection is illustrated by the flowcharts FIGS. 3A and 3B.

1. Upon insertion of the optical disk cartridge into the drive, the drive shall read the physical format information encoded onto the disc (FIG. 4 lists the Physical Format information for 120 mm DVD-RAM).
2. The media type in byte 0 (DVD-WORM or DVD-RAM) shall be ascertained. If the media type is not valid then the drive will generate an error message and no further processing will be allowed until a valid media type is placed in the drive.
3. If the media is determined to be of type DVD-WORM then the drive firmware shall enable checking of the SECTOR WRITTEN FLAG (SWF) and of the WRITE PROTECT FLAG (WPF) codes. This option control is provided so that if a media other than DVD-WORM was inserted in the drive, the drive would not check for the SECTOR WRITTEN FLAG and WRITE PROTECT FLAG during write, erase, and format operations. If the media type is DVD-WORM and the user selects a write, erase, or format operation the drive firmware shall perform the following:
4. Read the contents of the SECTOR WRITTEN FLAG and WRITE PROTECT FLAG.

5. If the WRITE PROTECT FLAG and SECTOR WRITTEN FLAG do not match then 2 additional reads of the flags shall be performed. If the flags do not match after the two additional read attempts then write operations to that sector shall be inhibited and an error code returned to the host.

6. If the WRITE PROTECT FLAG and SECTOR WRITTEN FLAG match then it will be determined if the sector is write protected. If the sector is write-protected (i.e. WRITE PROTECT FLAG and SECTOR WRITTEN FLAG are set) then an error code will be returned to the Host indicating that the operation failed as the target sector contains data.

7. If the WRITE PROTECT FLAG and SECTOR WRITTEN FLAG are NOT set, indicating that the sector is empty, write operations to the sector shall be allowed. As part of the write operation to the sector, the flag areas shall be written with the 1010 pattern indicating that the sector now holds data. Upon successful completion of the command a status of 'command completed successfully' shall be returned to the Host.

8. Upon return of the status to the Host, the drive shall be ready to accept additional write, erase, and/or format commands or any other drive commands issued to it by the Host.

It is proposed that DVD-WORM Media would be given new identifiers (e.g. model numbers) which would differentiate them, in the marketplace, from current DVD-RAM Media products.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A system for defining rewriteable data storage media defined by ECMA Standard ECMA-272 $2^{nd}$ edition (1999) for 120 mm DVD rewriteable disk (DVD-RAM) as a write once data storage media and for storing data thereon, the rewriteable data storage media having a user data area, the system comprising:

(a) a data storage device for reading and writing the data;

(b) rewriteable data storage media disposed within the data storage device for storing data;

(c) a media type indicator in the rewriteable data storage media adapted to define the rewriteable data storage media as write once data storage media;

(d) a first write protect flag associated with each user data sector in the rewriteable data storage media, the first write protect flag having a data written state and a data unwritten state;

(e) a second write protect flag associated with each user data sector area in the rewriteable data storage media, the second write protect flag having a data written state and a data unwritten state;

(f) means for changing the first write protect flag and the second write protect flag from the data unwritten state to the data written state when data has been written to each user data sector in the rewriteable data storage media; and (g) means for preventing writing to each user data sector in the rewriteable data storage media when the media type indicator defines the rewriteable data storage media as write once data storage media and when each of the first write protect flag and second write protect flag are in the data written state.

2. The system of claim 1, wherein each of the first write protect flag and second write protect flag further comprises a sequence of bytes.

3. The system of claim 2, wherein each of the first write protect flag and second write protect flag comprises a sequence of 5 bytes.

4. The system of claim 3, wherein each of the first write protect flag and second write protect flag contain a repeating pattern 1010.

5. The system of claim 1, wherein the means for preventing writing to the user data area further comprises means to compare the first write protect flag to the second write protect.

6. The system of claim 5, wherein the means to compare the first write protect flag and second write protect flag indicates to the data storage device that the user data area has been written when the first write protect flag matches the second write protect flag.

7. The system of claim 6, wherein the means to compare the first write protect flag and second write protect flag transmits an error code to the data storage device when the first write protect flag and the second write protect flag do not match.

8. The system of claim 7, wherein the means to compare the first write protect flag and the second write protect flag initiates two additional compares of the first write protect flag and the second write protect flag before transmitting the error code to the data storage device.

9. The system of claim 1, wherein the rewriteable data storage media is not contained in a cartridge.

10. A method for defining a rewriteable media defined by ECMA Standard ECMA-272 $2^{nd}$ Edition (1999) for 120 mm DVD rewriteable disk (DVD-RAM) as write once data storage media and for storing data thereon, the rewriteable disk having disk physical format information and a user data are, the rewriteable media being written by a drive having firmware therein, the drive initiating write operations, erase operations, and format operations to the rewriteable media, the method comprising the steps of:

(a) defining a rewriteable write once media type in a media identification byte of the disk physical format information;

(b) defining a first write protect flag and a second write protect flag in the user data area, each of the first write protect flag and second write protect flag having a data written state and a data unwritten state;

(c) examining the media identification byte when the rewriteable media is inserted in the drive;

(d) enabling the drive firmware to check the first write protect flag and second write protect flag if the media identification byte defines the media type as write once;

(e) disabling the drive firmware from checking the first write protect flag and second write protect flag if the media identification byte does not define the media type as write once;

(f) if the drive firmware is enabled to check the first write protect flag and second write protect flag, examining the first write protect flag and second write protect flag during each write operation, each erase operation, and each format operation of the drive;

(g) re-examining the first write protect flag and second write protect flag twice more if the first write protect flag and second write protect flag do not match;

(h) generating an error message if the first write protect flag and second write protect flag do not match after step (g);

(i) preventing the write operation, erase operation, and format operation if each of the first write protect flag and second write protect flag are in the data written state;

(j) allowing the write operation, erase operation, and format operation if each of the first write protect flag and second write protect flag are in the data unwritten state; and (k) setting the first write protect flag and second write protect flag to the data written state after the write operation, erase operation, and format operation.

11. The system of claim 10, wherein each of the first write protect flag and second write protect flag further comprises a sequence of bytes.

12. The system of claim 11, wherein each of the first write protect flag and second write protect flag comprises a sequence of 5 bytes.

13. The system of claim 12, wherein each of the first write protect flag and second write protect flag contain a repeating pattern 1010.

* * * * *